United States Patent [19]

Archer et al.

[11] Patent Number: 4,780,726

[45] Date of Patent: Oct. 25, 1988

[54] DEPOLYABLE REFLECTOR

[75] Inventors: John S. Archer, Rancho Palos Verdes; William B. Palmer, Palos Verdes Estates, both of Calif.

[73] Assignee: TRW Inc., Redondo Beach, Calif.

[21] Appl. No.: 677,259

[22] Filed: Dec. 3, 1984

[51] Int. Cl.[4] .......................................... H01Q 15/20
[52] U.S. Cl. .................................. 343/881; 343/840; 343/915
[58] Field of Search ................. 343/915, 840, DIG. 2, 343/916, 912, 880–882; 350/613, 626, 608

[56] References Cited

U.S. PATENT DOCUMENTS

| | | | |
|---|---|---|---|
| 2,181,181 | 11/1939 | Gerhard | 343/916 |
| 3,631,505 | 12/1971 | Carman | 343/915 |
| 3,699,576 | 10/1972 | Hoyer | 343/195 |
| 3,717,879 | 2/1973 | Ganssle | 343/915 |
| 3,978,490 | 8/1976 | Fletcher et al. | 343/915 |
| 4,315,265 | 2/1982 | Palmer et al. | 343/840 |
| 4,498,087 | 2/1985 | Imbiel et al. | 343/915 |
| 4,527,166 | 7/1985 | Luly | 343/840 |

Primary Examiner—William L. Sikes
Assistant Examiner—Michael C. Wimer
Attorney, Agent, or Firm—Noel F. Heal; Sol L. Goldstein

[57] ABSTRACT

An improved hydraulic reflector is provided for use as an antenna or solar reflector or the like, wherein the reflector is collapsible for highly compact stowage within a space vehicle and for convenient deployment in space to an expanded, generally dish-shaped configuration. The reflector comprises a rigid central dish hinged to a peripheral array of hingedly interconnected rigid panels which in turn carry a peripheral array of outwardly radiating extension ribs supporting an outer ring of flexible reflector material. The rigid panels and the extension ribs are movable together between a collapsed state folded substantially into a cylindrical envelope defined by the diametric size of the rigid central dish and a deployed configuration lying generally within a surface of revolution common to the central dish, such as a paraboloid surface in the case of an antenna.

12 Claims, 2 Drawing Sheets

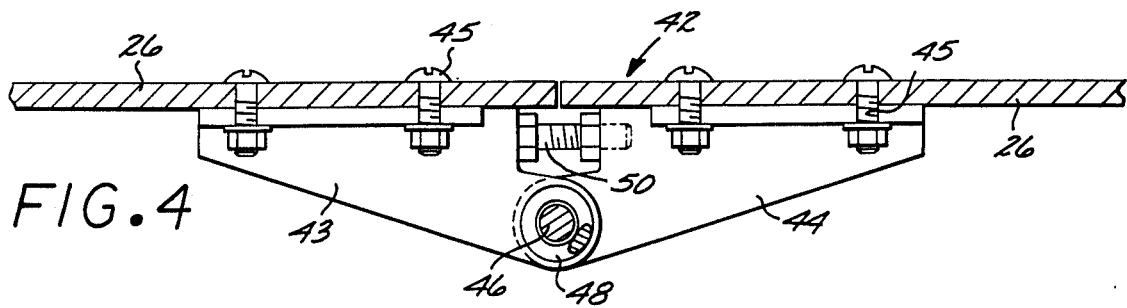
FIG.4
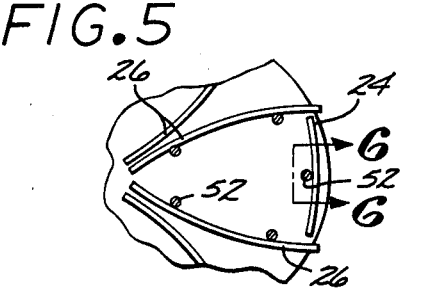
FIG.5
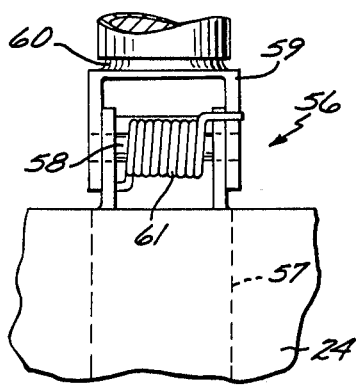
FIG.6
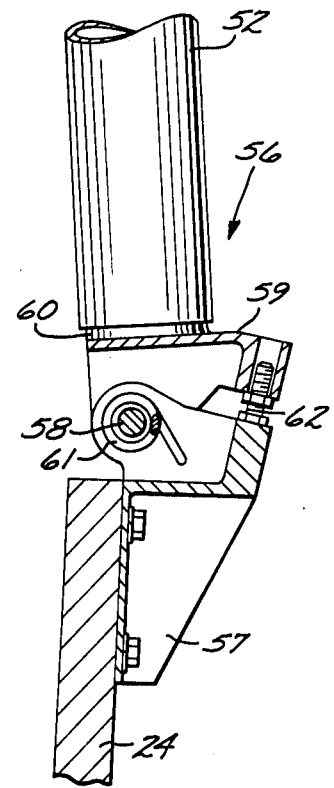
FIG.7
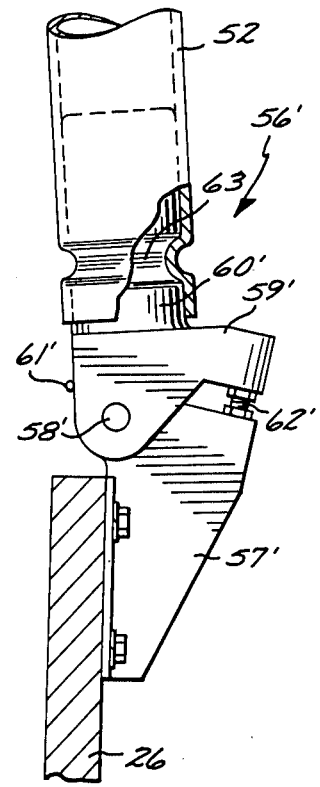
FIG.8
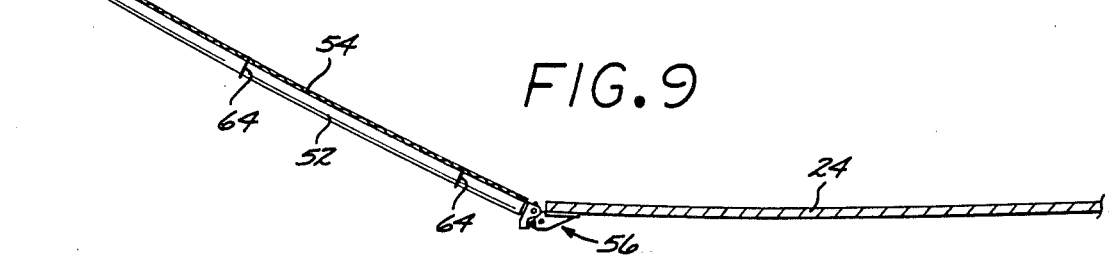
FIG.9
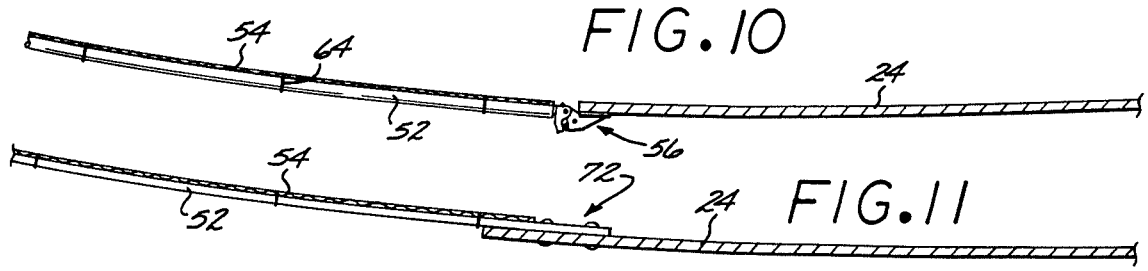
FIG.10
FIG.11

DEPOLYABLE REFLECTOR

BACKGROUND OF THE INVENTION

This invention relates generally to deployable and generally dish-shaped structures of the type designed primarily for use as an antenna or the like in an outer space environment. More particularly, this invention relates to an improved deployable reflector which can be folded from a highly compact collapsed state to a deployed state of an expanded diametric size.

Collapsible and deployable dish-shaped structures in general are relatively well known and have been widely used in outer space applications to provide, for example, an antenna or the like for receiving and/or transmitting radio signals. Such collapsible structures advantageously can be stowed compactly in a space vehicle for launching into outer space and then deployed to the desired expanded dish-shaped configuration. Examples of such dish-shaped structures are found in U.S. Pat. Nos. 3,064,534; 3,176,303; 3,286,270; 3,360,798; 3,377,594; 3,383,692; 3,397,399; 3,617,113; 3,699,576; 3,717,879; 3,715,760; and 4,315,265.

In one common form, collapsible and deployable dish structures for space applications have been constructed from a network of lightweight frame components designed to support a flexible material having an electrically conductive reflective surface, such as a foil or the like. While such structures are well-suited for compact stowage for launching, deployment in outer space to the expanded dish-shaped configuration has not occurred with the desired degree of simplicity and reliability. Moreover, the flexible reflector material has not provided the requisite precision reflector surface geometries required for some high resolution and/or high frequency applications, for example, as may be required for a parabolic surface antenna.

Other known deployable dish structures have been constructed from rigid elements or panels to provide precision reflector geometries. However, the majority of such rigid dish structures have been undesirably complex in design and assembly, have not been collapsible to a satisfactorily compact state, and further have proven to be generally unreliable in deployment. Improved rigid dish structures designed for reliable deployment in space, such as those described in commonly assigned U.S. Pat. Nos. 3,715,760 and 4,315,265, have required relatively large stowage envelopes in relation to expanded diametric size thereby placing undue size limitations upon the dish structures when deployed.

There exists, therefore, a significant need for an improved dish-shaped structure designed particularly for use as an antenna or the like in an outer space environment, wherein the structure is collapsible to a highly compact state for stowage within the cargo bay of a space vehicle, and further wherein the structure is deployable in space quickly, easily, and reliably to an expanded state with satisfactory geometric precision. The present invention fulfills these needs and provides further related advantages.

SUMMARY OF THE INVENTION

In accordance with the invention, an improved deployable reflector is provided for use particularly in an outer space environment as an antenna, solar reflector, or other requisite dish-shaped structure. The improved reflector includes a rigid inner dished section defined by a rigid central dish hinged peripherally to a plurality of hingedly interconnected rigid panels. These rigid panels in turn carry an outer ring section of the reflector defined by a plurality of outwardly radiating extension ribs supporting an outer ring of flexible reflector material.

In the preferred form of the invention, the inner dished section of the improved deployable reflector generally corresponds with the collapsible dish-shaped structure shown and described in commonly assigned U.S. Pat. No. 3,715,760. More particularly, the rigid central dish is formed as a portion of a predetermined surface of revolution, such as a paraboloid in the case of a parabolic antenna, with the center of the rigid dish coinciding with the apex of the parabola. The diametric size of the rigid central dish is selected to correspond generally with a cylindrical stowage envelope defined by the available stowage volume in a space vehicle, for example, within the cargo bay of the so-called space shuttle.

The rigid panels carried by the central dish are provided in a plurality of panel assemblies each including an arcuately-shaped main panel hinged to the central dish and further hinged between a pair of similarly arcuate side panels which are in turn hingedly connected to side panels of adjacent panel assemblies. The hinged connections of the panel assemblies are designed to accommodate panel movement between a collapsed or folded state substantially within the cylindrical stowage envelope and an expanded deployed state with the rigid panels lying generally within the surface of revolution.

The outer ring section of the reflector provides a substantial overall increase in effective size in the deployed state and thus significantly improves overall reflector performance, all without requiring diametric size increase in the cylindrical stowage envelope. In the preferred form, the extension ribs are hinged or otherwise suitably attached peripherally to the rigid panels of the inner dished section and these ribs support the outer ring of flexible reflector material such as a suitably surfaced reflective membrane, a metal mesh material, or the like. These extension ribs are designed for folding to the collapsed state generally within the cylindrical stowage envelope and with the flexible reflective material suspended and folded therebetween. On deployment, biasing means such as springs or other resilient means displaces the extension ribs to the expanded deployed state with the flexible reflective material stretched taut in the shape of an outer ring surrounding the deployed rigid inner dished section. The extension ribs are curvedly shaped each to lie when deployed generally within the predetermined surface of revolution, and stop means are preferably provided for insuring extension rib movement to and stoppage at said surface of revolution.

The improved collapsible and deployable reflector of the invention can be stowed securely within the cargo bay of a space vehicle by means of support structure carried typically on the keel side of the rigid central dish. A rigid truss extends centrally from the rigid dish within the collapsed rigid panels and the collapsed outer ring section and has a free end supporting a tie-down fitting releasably retaining the outer ends of the extension ribs in the collapsed state for stowage.

Other features and advantages of the present invention will become more apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 4 is an enlarged fragmented sectional view taken generally on the line 4—4 of FIG. 1;

FIG. 5 is a fragmented sectional view, shown somewhat in schematic form, taken generally on the line 5—5 of FIG. 2;

FIG. 6 is an enlarged fragmented sectional view taken generally on the line 6—6 of FIG. 5;

FIG. 7 is an enlarged fragmented sectional view taken generally on the line 7—7 of FIG. 1;

FIG. 8 is an enlarged fragmented sectional view taken generally on the line 8—8 of FIG. 1;

FIG. 9 is a fragmented sectional view taken generally on the line 9—9 of FIG. 2 and showing a portion of the improved reflector in the collapsed state;

FIG. 10 is a fragmented sectional view similar to FIG. 9 but showing the reflector in the deployed state; and FIG. 11 is a fragmented sectional view similar to FIG. 10 but showing an alternative form of the invention.

DETAILED DESCRIPTION OF THE PREFERRED EMBODIMENT

Figure 1:
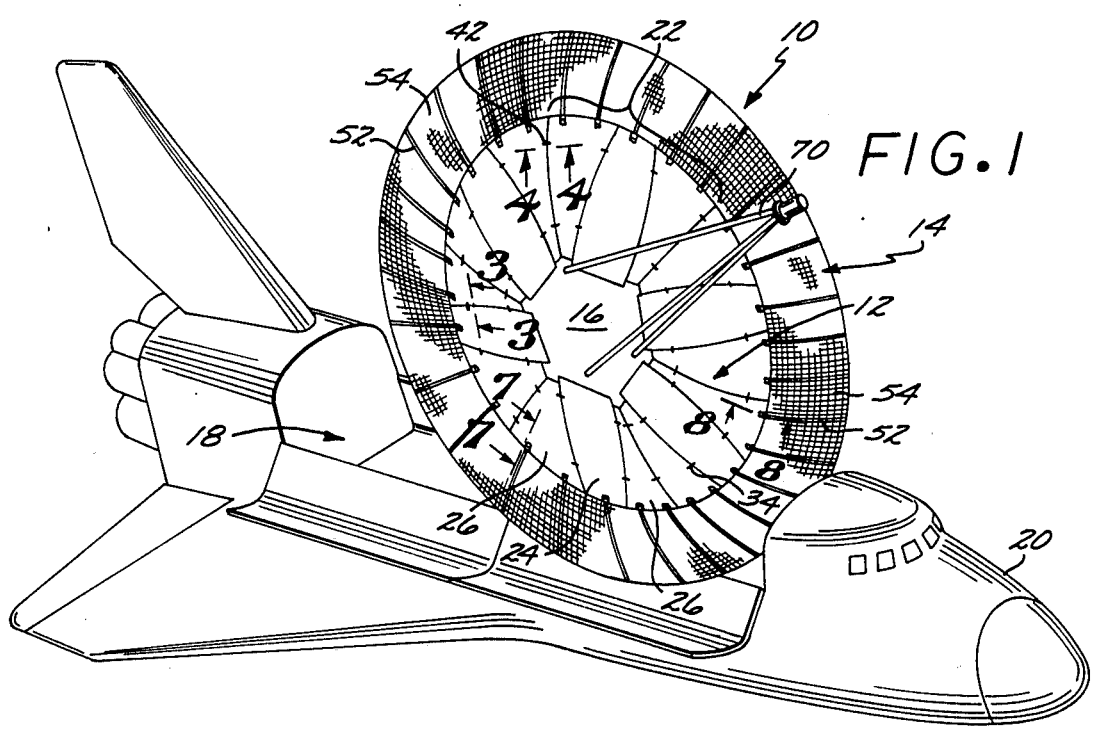
FIG. 1 is a perspective view illustrating a deployable reflector embodying the novel features of the invention and shown in a deployed state carried by a space vehicle.
Figure 2:
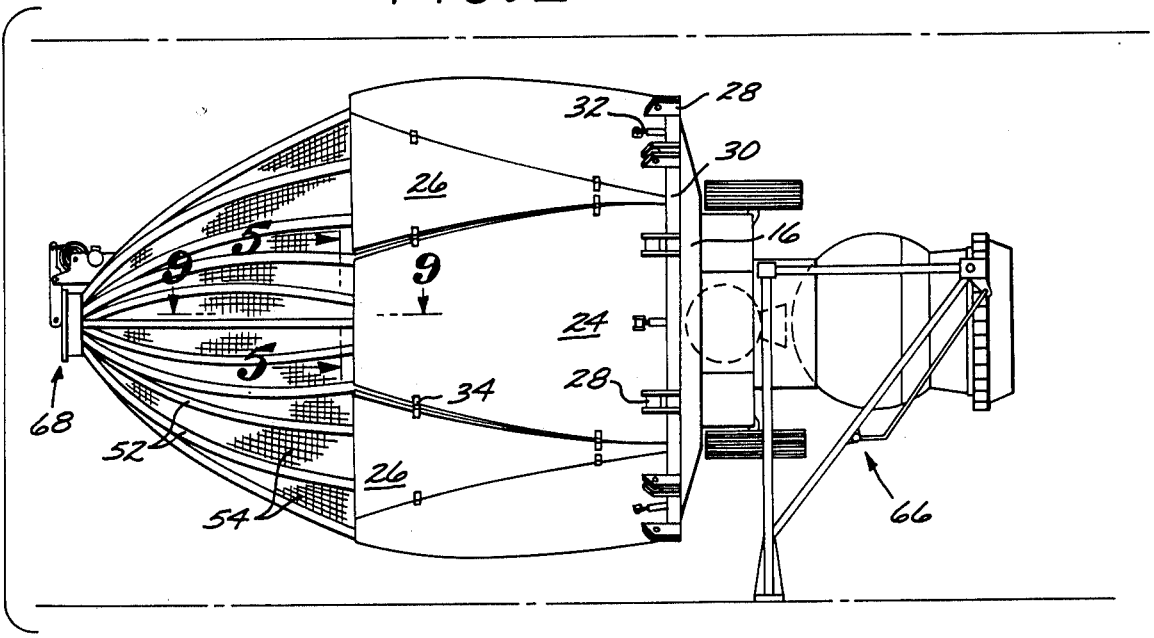
FIG. 2 is an enlarged side elevation view of the reflector shown in a collapsed state for stowage.

As shown in the exemplary drawings, an improved deployable reflector referred to generally by the reference numeral 10 is provided particularly for use as an antenna or the like in an outer space environment. The improved reflector 10 includes a rigid inner dished section 12 surrounded by a flexible outer ring section 14 which cooperatively define a reflective structure of relatively large diametric size when deployed, as viewed in FIG. 1, but which can be collapsed, as shown in FIG. 2, to fit within a relatively compact stowage envelope.

The improved reflector 10 of the present invention is designed particularly for use in an outer space environment for use as an antenna for transmitting and/or receiving radio signals, although other space and nonspace applications, such as a solar reflector or the like are contemplated. The reflector 10 is advantageously designed for folding movement to the collapsed state shown in FIG. 2 to fit within a highly compact and generally cylindrical stowage envelope defined generally by the diametric size of a rigid central dish 16 forming a portion of the inner dished section 12. The remainder of the inner dished section 12 and the flexible outer ring section 14 are foldable to positions substantially within the thus-defined stowage envelope to fit within the cargo bay 18 (FIG. 1) of a space vehicle 20, such as the shuttle spacecraft during launch into outer space. When deployment of the reflector 10 is desired, the folded portions thereof are deployed quickly, easily, and reliably to the expanded or deployed state (FIG. 1) to provide a high performance reflective surface having an overall diametric or aperture size substantially greater than a rigid element reflector of the type disclosed in U.S. Pat. Nos. 3,715,760 or 4,315,265 and compatible with the same stowage envelope constraints. The rigid inner dished section 12 of the improved reflector provides a high precision reflective surface geometry for high performance operation capability whereas the flexible outer ring section 14 closely conforms with the contour of the inner dished section 12 to extend overall performance by substantially increasing overall aperture size and further provides the reflector with the capability for multiple frequency operation.

As shown in detail in FIGS. 1-4, the preferred rigid inner dished section 12 of the improved reflector 10 generally corresponds in structure and operation with the rigid collapsible dish structure shown and described in the above-referenced and commonly assigned U.S. Pat. No. 3,715,760, which is incorporated by reference herein. More particularly, the rigid inner dished section 12 comprises the central dish 16 formed typically from a relatively lightweight yet structurally rigid material such as a honeycomb core structure lined on one side with an appropriate reflective material having, in the case of an antenna, high electrical conductivity. This central dish 16 is shaped to correspond with a portion of a predetermined geometric surface of revolution, with the illustrative drawings showing the dish 16 as an apex portion of a paraboloid for use as a parabolic antenna.

The rigid central dish 16 hingedly supports a peripheral array of rigid panels which complete the inner dished section 12 and are also formed from a relatively rigid yet lightweight material and have a reflective surface as described above with respect to the dish 16. These rigid panels are provided as a plurality of panel assemblies 22 arranged about the periphery of the dish 16 with each panel assembly including a main panel 24 disposed between an associated pair of side panels 26. Importantly, all of the main panels 24 and the side panels 26 have a generally arcuate shape to lie, when in the deployed state, generally within a surface of revolution common to and directly adjoining the central dish 16.

The rigid main and side panels 24 and 26 of the panel assemblies 22 are hinged relative to the central dish 16 and relative to each other in the same manner shown and described in said commonly assigned U.S. Pat. No. 3,715,760. More specifically, each main panel 24 is hinged to the periphery of the central dish 16 by a circumferentially spaced pair of hinges 28 for pivoting movement between the collapsed or folded state (FIG. 2) and the deployed state (FIG. 1). Movement of the main panels 24 to the deployed state is desirably rendered automatic by incorporation of appropriate springs (not shown) into the hinges or by use of other biasing means, all in a manner well understood by those skilled in the art. Moreover, the various main panels 24 are desirably coupled to each other for simultaneous deployment movement by a universal linkage 30 of the type shown and described in the above-referenced and commonly assigned U.S. Pat. No. 4,315,265, which is incorporated by reference herein. Dampers 32 coupled between the central dish 16 and the main panels 24 control the rate of movement to the deployed state.

Figure 3:
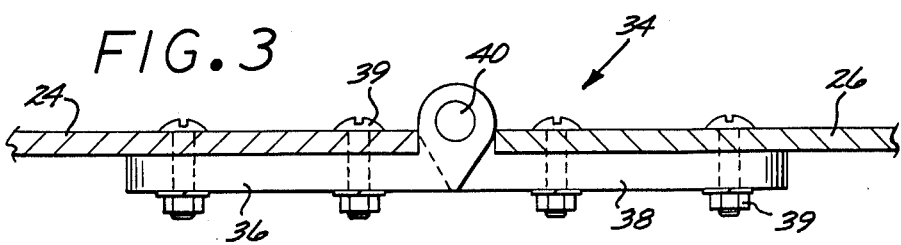
FIG. 3 is an enlarged fragmented sectional view taken generally on the line 3—3 of FIG. 1.

Each of the rigid side panels 26 is connected to its associated main panel 24 by a radially spaced pair of hinges 34, one of which is shown by way of example in FIG. 3. As shown, this side panel hinge 34 comprises a pair of hinge leaves 36 and 38 secured by bolts 39 or other fastener means respectively to the rear sides of the adjacent main panel 24 and side panel 26. These hinge leaves 36 and 38 are pivotally connected to each other by a pivot pin 40 which is set at an appropriate angle to accommodate relative pivoting motion of the panels between the collapsed and deployed states.

The side panels 26 of each panel assembly 22 are hinged in turn by a radially spaced pair of hinges 42 to an adjacent side panel of an adjacent panel assembly. An exemplary one of these hinges 42 is shown in FIG. 4 to include a pair of hinge leaves 43 and 44 secured by bolts 45 or other suitable fastener means respectively to the two side panels 26 and pivoted to each other by a pivot pin 46 set at the necessary angle to accommodate panel movement between the collapsed and deployed states. A spring 48 is provided to urge the adjacent side panels 26 toward the deployed state, and a stop bolt 50 or the like is adjustably carried by the hinge leaf 43 for engaging the rear side of the adjacent side panel to prevent further relative pivoting motion when the deployed state is reached.

The flexible outer ring section 14 substantially increases the diametric size of the deployed reflector 10 with structure that fits easily when collapsed within the cylindrical stowage envelope. The outer ring section is defined by a plurality of lightweight extension rods 52 projecting generally radially outwardly from the rigid inner dished section 12 and supporting an annular outer ring of a selected flexible reflector material 54. When deployed, the extension rods 52 have a longitudinally curved shaped for supporting the flexible reflector material 54 generally within a surface of revolution common to and directly adjoining the inner dished section 12. The flexible reflector material is stretched taut by the deployed rods 52 and thus provides a plurality of generally planar surface sections between the rods 52. Importantly, these planar surface sections are provided in a relatively large number for individual close conformance with the surface of revolution, with any deviation from the surface of revolution being more than offset by the limitation of the planar surface sections to the perimeter region of the reflector and further by the substantial overall increase in reflector diametric size.

In the preferred form, as shown in FIGS. 5–7, an extension rod 52 is hinged to a central point at the periphery of each rigid main panel 24 by a springloaded hinge 56. More particularly, each one of these hinges 56 includes an inner bracket 57 secured by bolts or the like to the rear side of the adjacent main panel 24 and coupled via a pivot pin 58 to an upper bracket 59 having a tubular mount 60 received into and anchored within the radially inner end of the adjacent extension rod 52. A spring 61 reacts between the two brackets 57 and 59 to urge the extension rod 52 normally from the collapsed state toward the deployed state, as viewed sequentially in FIGS. 9 and 10, and an adjustable stop bolt 62 carried by the upper bracket 59 is engageable with the lower bracket 57 to prevent further pivoting motion when the deployed state is reached.

Additionally, in the illustrative form of the invention, a pair of the extension rods 52 are hinged to each one of the rigid side panels 26 by a circumferentially spaced pair of compound spring-loaded hinges 56', as shown in FIGS. 5 and 8. Each one of these compound hinges 56' corresponds generally with the above-described hinge 56 by inclusion of lower and upper hinge brackets 57' and 59', a pivot pin 58', a biasing spring 61', and the stop bolt 62'. However, to accommodate a complex hinge action as required for these extension rods to swing between the collapsed and deployed states along with the side panels 26, the tubular mount 60' on the upper bracket 59' is rotatably received into the lower end of the adjacent extension rod, and an annular crimp 63 is formed in the rod and mount to prevent separation therebetween. Alternatively, other types of compound and/or skewed hinge structures can be used.

The flexible reflector material 54 is securely attached to the extension rods 52 in any suitable manner, such as by a longitudinal spaced plurality of loop-type fasteners 64, as shown in FIGS. 9 and 10. Alternatively, any other type of fastener can be used, inclusive of welds, provided such fastener is compatible with the type of reflector material selected. For example, in some instances, the reflector material can be a flexible membrane having an appropriate reflective front surface, such as an electrically conductive surface. Other types of reflector materials would include, for example, a reflective and/or conductive mesh having a mesh spacing compatible with certain signal transmission frequencies.

The improved reflector 10 as described above can be stowed compactly within a relatively small envelope having a diametric size limited to the requirements of the rigid inner dished section 12. The reflector 10 can thus be stowed as viewed in FIG. 2, for example, by an appropriate support structure 66 which would normally be connected securely as shown to the keel side of the rigid central dish 16. From the dish 16, the collapsed main and side panels 24 and 26 and the collapsed extension rods 52 extend generally axially relative to the dish and are confined within the envelope, with the reflector material 54 folded loosely within the envelope. A tie-down fitting 68 typically carried at the free end of a central antenna truss 70 (FIG. 1) releasably holds the outer ends of the extension rods 52 in the collapsed state. In this state, the reflector can be launched within the space vehicle 20 into outer space.

When deployment is desired, the reflector 10 can be removed or expelled from the space vehicle cargo bay 18. The tie-down fitting can then be released pyrotechnically or by other suitable release means whereupon the main and side panels 24 and 26 unfold to the deployed position simultaneously with the extension rods 52 under the influence of the various spring-loaded hinges. Full deployment is thus rapid, easy, and reliable.

Various modifications to the improved reflector 10 of the present ivnention are readily apparent from the foregoing description. For example, as viewed in FIG. 11, the extension rods 52 mounted on the rigid main panels 24 can be securely attached thereto by rigid brackets 72, in which case the rods themselves are provided with sufficient resiliency to accommodate movement under stress to the collapsed state. However, on deployment, the resiliency of these rods provides the biasing force for automatic movement to the deployed state. Accordingly, this and other modifications are included in the scope of the invention without limitation, except as expressly set forth in the appended claims.

What is claimed is:
1. A deployable reflector, comprising:
   a substantially rigid central dish formed generally in conformance with a predetermined surface of revolution;
   a plurality of panel assemblies carried about the periphery of said central dish, each of said panel as- semblies including a substantially rigid main panel hinged generally to the periphery of said central dish and a pair of substantially rigid side panels hinged generally to opposite sides of said main panel, said side panels of each panel assembly being hinged in turn to a side panel of an adjacent one of said panel assemblies;

said main and side panels of said panel assembly each having a generally arcuate shape and being movable together between a collapsed state disposed substantially within a generally cylindrical stowage envelope defined by the diametric size of said dish to a deployed state lying generally within said surface of revolution at a position adjoining the periphery of said central dish;

a plurality of arcuate extension rods projecting generally radially outwardly from the periphery of said panel assemblies and movable with respect to said panel assemblies between a collapsed state disposed substantially within said stowage envelope when said main and side panels are in said collapsed state to a deployed state lying generally within said surface of revolution at a position adjoining the periphery of said main and side panels when in said deployed state; and flexible reflector material having a generally annular shape and carried by said extension rods, said flexible reflector material being folded loosely between said extension rods in said collapsed state and being stretched relatively taut between said extension rods in said deployed state.

2. The deployable reflector of claim 1 wherein said surface of revolution is a paraboloid, said central dish comprising the apex portion of said paraboloid.

3. The deployable reflector of claim 2 wherein said central dish, said main and side panels, and said flexible reflector material include electrically conductive means on the interior surface of said paraboloid.

4. The deployable reflector of claim 1 including means for biasing said panel assemblies and said extension rods toward the deployed state.

5. The deployable reflector of claim 1 including means for controlling the rate of movement of said panel assemblies to the deployed state.

6. The deployable reflector of claim 5 including means for stopping movement of said extension rods relative to said panel assemblies when said extension rods reach the deployed state.

7. The deployable reflector of claim 5 including means for releasably supporting said extension rods in the collapsed state.

8. The deployable reflector of claim 1 including spring-loaded hinge means for biasing said extension rods toward the deployed state.

9. The deployable reflector of claim 1 wherein said extension rods are rigidly attached to said panel assemblies and are formed from a resilient material bendable for movement from a relatively unstressed condition in the deployed state to a stressed condition in the collapsed state.

10. The deployable reflector of claim 1 further including a plurality of simple hinges for respectively connecting a plurality of said extension rods to said main panels and a plurality of compound hinges for respectively connecting a plurality of said extension rods to said side panels.

11. The deployable reflector of claim 1 wherein said flexible reflector material comprises a flexible membrane.

12. The deployable reflector of claim 1 wherein said flexible reflector material comprises a mesh material.

* * * * *